United States Patent
Jung et al.

(10) Patent No.: US 10,101,513 B2
(45) Date of Patent: Oct. 16, 2018

(54) METHOD FOR MANUFACTURING THIN POLARIZER, THIN POLARIZER MANUFACTURED USING SAME, AND POLARIZING PLATE

(71) Applicant: LG CHEM, LTD., Seoul (KR)

(72) Inventors: Jonghyun Jung, Daejeon (KR); Sung Hyun Nam, Daejeon (KR); Kyun Il Rah, Daejeon (KR); Hye Min Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 235 days.

(21) Appl. No.: 15/025,037

(22) PCT Filed: Sep. 23, 2014

(86) PCT No.: PCT/KR2014/008836
§ 371 (c)(1),
(2) Date: Mar. 25, 2016

(87) PCT Pub. No.: WO2015/046858
PCT Pub. Date: Apr. 2, 2015

(65) Prior Publication Data
US 2016/0231485 A1 Aug. 11, 2016

(30) Foreign Application Priority Data

Sep. 30, 2013 (KR) .................... 10-2013-0117008
Sep. 17, 2014 (KR) .................... 10-2014-0123603

(51) Int. Cl.
*G02B 5/30* (2006.01)
*B29C 55/06* (2006.01)
*B29C 55/14* (2006.01)

(52) U.S. Cl.
CPC .............. *G02B 5/305* (2013.01); *B29C 55/06* (2013.01); *G02B 5/3033* (2013.01); *B29C 55/146* (2013.01)

(58) Field of Classification Search
CPC ...... G02B 5/30; G02B 5/3025; G02B 5/3033; G02B 5/3041; G02B 5/305; B29C 55/00; B29C 55/02; B29C 55/023; B29C 55/04; B29C 55/06; B29C 55/065; B29C 55/146; B29C 55/20
See application file for complete search history.

(56) References Cited

U.S. PATENT DOCUMENTS

2010/0202051 A1 8/2010 Yoshimi et al.
2012/0305181 A1 12/2012 Nam et al.
(Continued)

FOREIGN PATENT DOCUMENTS

| JP | 2012-073580 A | 4/2012 |
| JP | 2012-173724 A | 9/2012 |
| JP | 2013-008019 A | 1/2013 |

(Continued)

*Primary Examiner* — Derek S Chapel
*Assistant Examiner* — Adam W Booher
(74) *Attorney, Agent, or Firm* — Dentons US LLP

(57) ABSTRACT

The present invention relates to a method for manufacturing a thin polarizer, the method comprising the steps of: forming an auxiliary support on both ends in the transverse direction (TD) of an unstretched polyvinyl alcohol-based film; and wet-stretching the polyvinyl alcohol-based film, which has the auxiliary support formed thereon, in the machine direction (MD) of the polyvinyl alcohol-based film, in such that the thickness of the polyvinyl alcohol-based film is 10 μm or less.

10 Claims, 1 Drawing Sheet

(56) References Cited

U.S. PATENT DOCUMENTS

2013/0128357 A1    5/2013   Izaki et al.
2014/0008572 A1    3/2014   Yasui et al.

FOREIGN PATENT DOCUMENTS

| JP | 2013-011837 A | 1/2013 |
| JP | 2013-520685 A | 6/2013 |
| JP | 2016-020952 A | 2/2016 |
| JP | 2016-126021 A | 7/2016 |
| KR | 10-2010-0102291 A | 9/2010 |
| KR | 10-2010-0102292 A | 9/2010 |
| TW | 200923446 A | 6/2009 |

[Figure 1]
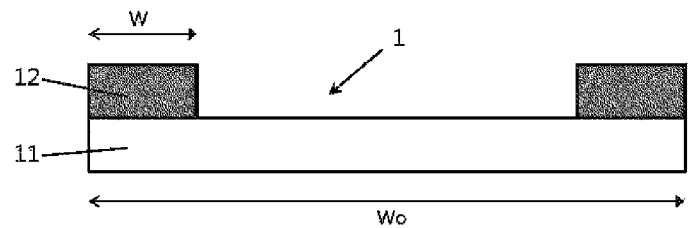
[Figure 2]
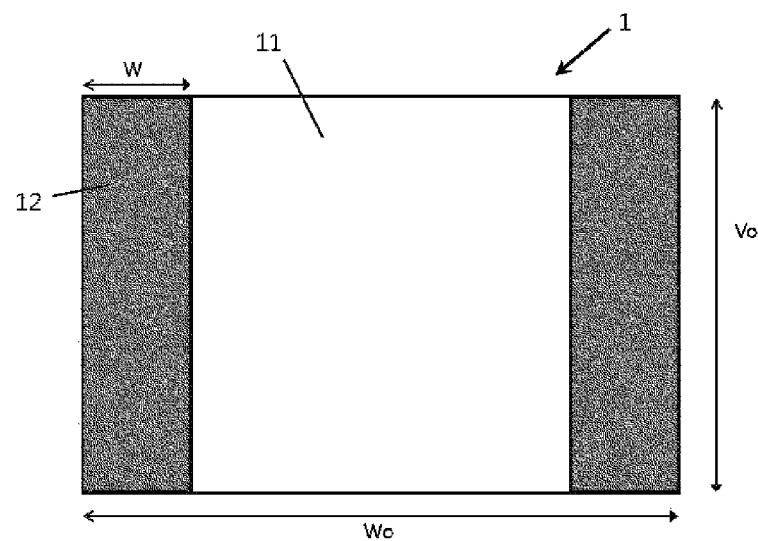

METHOD FOR MANUFACTURING THIN POLARIZER, THIN POLARIZER MANUFACTURED USING SAME, AND POLARIZING PLATE

This application is a National Stage entry of International Application No. PCT/KR2014/008836, filed on Sep. 23, 2014, and claims priority to Korean Application Nos. 10-2013-0117008, filed Sep. 30, 2013 and 10-2014-0123603, filed Sep. 17, 2014, all of which are hereby incorporated by reference in their entireties as if fully set forth herein.

TECHNICAL FIELD

The present invention relates to a method for manufacturing a thin polarizer, a thin polarizer fabricated thereby and a polarizing plate comprising the same, and more particularly, to a method for manufacturing a thin polarizer having a thin thickness of 10 μm or less, a thin polarizer manufactured thereby and a polarizing plate comprising the same.

BACKGROUND ART

Polarizers that are used in polarizing plates are optical elements for polarizing natural light or any polarized light in a certain direction, and are widely used in display devices such as liquid crystal display devices and organic light-emitting devices (OLED). Polarizers that are currently used in the display devices are generally made of a polyvinyl alcohol-based polarizing film which contains iodine or a dichroic dye and in which molecular chains are oriented in a specific direction.

The polyvinyl alcohol-based polarizing film is manufactured by dyeing a polyvinyl alcohol-based film with iodine or a dichroic dye, and then crosslinking the film and stretching the film in a specific direction. Herein, the stretching process may be performed either by wet stretching in a solution such as an aqueous boric acid solution or an aqueous iodine solution or by dry stretching in air, and the film is generally stretched at least five times. However, in this conventional manufacturing process, it is required that the thickness of the polyvinyl alcohol-based film before stretching should exceed 60 μm so that the film is stretched without breakage. If the thickness of the polyvinyl alcohol-based film before stretching is thinner than 60 μm, the side ends perpendicular to the stretching direction of the polyvinyl alcohol-based film will be easily rolled up due to an increase in the degree of swelling of the film, and the rolled portion adheres to the film surface to cause surface non-uniformity. In addition, due to the thin thickness, the modulus per unit area in the stretching process will increase, and thus breakage of the film will easily occur.

In recent years, as display devices have become thinner, polarizers have also been required to have a thinner thickness. However, when conventional polyvinyl alcohol-based films having a thickness before stretching of more than 60 μm are used, there is a limit to reducing the thickness of polarizers. Thus, studies have been attempted to manufacture thinner polarizers.

Specifically, the prior art discloses a method of manufacturing a thin polarizer using a laminate prepared either by coating a hydrophilic polymer layer on a substrate layer or by co-extruding a substrate layer-forming material and a hydrophilic polymer layer-forming material, rather than stretching a polyvinyl alcohol-based film alone. However, the coating or co-extrusion method had problems in that it is not easy to separate a polyvinyl alcohol layer from a substrate after stretching, and because a high peel force is required for this separation, the polyvinyl alcohol layer is likely to be damaged or deformed in the separation process, resulting in deterioration in the optical properties such as degree of polarization of the polyvinyl alcohol film. Further, because the coating or co-extrusion method is performed either by extruding polyvinyl alcohol resin after melting or by applying a coating solution of polyvinyl alcohol, the physical properties of the polyvinyl alcohol film manufactured are likely to change depending on extrusion conditions, coating conditions or film-forming conditions, and thus the physical properties of the resulting polyvinyl alcohol film may be deteriorated. In addition, there is a shortcoming in that the stretching property of the polyvinyl alcohol-based film may change depending on the properties of the substrate.

DISCLOSURE

Technical Problem

The present invention has been made in order to solve the above-described problems, and it is an object of the present invention to provide a method for manufacturing a thin polarizer having excellent physical properties, in which an auxiliary support is formed on both ends in the transverse direction (TD) of an unstretched polyvinyl-based film, and then wet-stretched, and thus the film can be stretched at a high ratio even when it is stretched alone.

Technical Solution

In accordance with an embodiment of the present invention, there is provided a method for manufacturing a thin polarizer, the method comprising the steps of: forming an auxiliary support on both ends in the transverse direction (TD) of an unstretched polyvinyl alcohol-based film; and wet-stretching the polyvinyl alcohol-based film, which has the auxiliary support formed thereon, in the machine direction (MD) of the polyvinyl alcohol-based film in such that the thickness of the polyvinyl alcohol-based film is 10 μm or less.

Herein, the auxiliary support may be a polymer film comprising at least one selected from the group consisting of polyvinyl alcohol-based resin, low-density polyethylene resin, high-density polyethylene resin, high-density polyethylene/ethylene vinyl acetate copolymer resin, polypropylene resin, isophthalic acid-containing polyethylene terephthalate resin, water-soluble cellulose resin, and acrylic resin.

Further, the auxiliary support is preferably a polymer film having a glass transition temperature between 30° C. and 60° C., and preferably has a shrinkage rate of 3.0% or less after wet stretching.

Herein, the auxiliary support may be formed on at least one of the upper and lower surfaces of both ends in the transverse direction (TD) of the unstretched polyvinyl alcohol-based film.

Meanwhile, the step of forming the auxiliary support may comprise a step of attaching a polymer film to both ends in the transverse direction (TD) of the unstretched polyvinyl alcohol-based film by an adhesive, followed by drying.

Further, the auxiliary support may be formed by folding both ends in the transverse direction (TD) of the unstretched polyvinyl alcohol-based film and attaching the folded ends to the film by an adhesive, followed by drying.

Meanwhile, the ratio of the width of the auxiliary support to the width of the unstretched polyvinyl alcohol-based film may be 0.06-0.25.

In addition, the method may further comprise, after the step of wet-stretching the polyvinyl alcohol-based film, which has the auxiliary support formed thereon, in the machine direction (MD) of the film, a step of separating the auxiliary support from the polyvinyl alcohol-based film.

In accordance with another embodiment of the present invention, there are provided a thin polarizer, which is manufactured by the above-described method and has a thickness of 10 μm or less, a single transmittance of 40-43% and a degree of polarization of 99% or higher, and a polarizing plate comprising the thin polarizer.

Advantageous Effects

In the method of manufacturing a thin polarizer using wet stretching according to the present invention, a single film can be stretched at a high ratio, and a thin polarizer having a thickness of 10 μm or less can be manufactured with high productivity without rolling at both ends and breakage of the film.

DESCRIPTION OF DRAWINGS

FIG. 1 is a cross-sectional view illustrating a polyvinyl alcohol-based film having an auxiliary support formed thereon according to the present invention.

FIG. 2 is a top view illustrating a polyvinyl alcohol-based film having an auxiliary support formed thereon according to the present invention.

BEST MODE

Hereinafter, exemplary embodiments of the present invention will be described. However, the present invention is not limited to the exemplary embodiments disclosed below and can be embodied in a variety of different forms. Moreover, these embodiments are provided so that this disclosure will be thorough and complete, and will fully convey the scope of the present invention to those skilled in the art.

The present inventors have conducted many studies to develop a method for manufacturing a thin polarizer, which enables a polyvinyl alcohol-based film to be wet-stretched alone at a high ratio, and as a result, have found that, when an auxiliary support is formed on both ends in the transverse direction (TD) of an unstretched polyvinyl alcohol-based film, the film can be wet-stretched without rolling at both ends and breakage of the film, and a thin polarizer having excellent optical properties can be manufactured, thereby completing the present invention.

In one aspect of the present invention, there is provided a method for manufacturing a thin polarizer, the method comprising the steps of: forming an auxiliary support on both ends in the transverse direction (TD) of an unstretched polyvinyl alcohol-based film; and wet-stretching the polyvinyl alcohol-based film, which has the auxiliary support formed thereon, in the machine direction (MD) of the polyvinyl alcohol-based film in such that the thickness of the polyvinyl alcohol-based film is 10 μm or less.

In the method of the present invention, in the step of forming an auxiliary support on both ends in the transverse direction (TD) of an unstretched polyvinyl alcohol-based film, the unstretched polyvinyl alcohol-based film has a degree of polymerization of about 1,000-10,000, and preferably about 1,500-5,000, but is not limited thereto. When the degree of polymerization is within the above range, the molecules in the film can freely move, and can be easily mixed with iodine or a dichroic dye.

Further, the thickness of the unstretched polyvinyl alcohol-based film is about 10-60 μm, and preferably about 10-40 μm. If the thickness of the polyvinyl alcohol-based film is greater than 60 μm, a thickness of 10 μm or less will be difficult to achieve even when the film is stretched, and if the thickness is less than 10 μm, the film will be easily broken during stretching.

Meanwhile, the unstretched polyvinyl alcohol-based film that is used in the present invention may be a commercially available polyvinyl alcohol-based film, and examples thereof include P30, PE20, PE30 and PE60 (Kuraray Co., Ltd., Japan), and M1000, M1500, M2005, M3000 and M6000 (Nippon Synthetic Chemical Industry Co., Ltd.).

Meanwhile, the auxiliary support may be formed of a polymer film. For example, it may be a polymer film comprising at least one selected from the group consisting of polyvinyl alcohol-based resin, low-density polyethylene resin, high-density polyethylene resin, high-density polyethylene/ethylene vinyl acetate copolymer resin, polypropylene resin, isophthalic acid-containing polyethylene terephthalate resin, water-soluble cellulose resin, and acrylic resin, but is not limited thereto.

However, the polymer film is preferably a polymer film formed of polyvinyl alcohol-based film. Particularly, the polymer film is most preferably a polymer film having a composition identical or similar to that of the unstretched polyvinyl alcohol-based film that is the substrate film. This is because, when the polyvinyl alcohol-based film is stretched after the auxiliary support is attached thereto, a stretching behavior that is identical or similar between the polyvinyl alcohol-based film and the polymer film can be ensured, and thus physical damage such as distortion or breakage can be prevented from occurring, and the optical properties of the film can be prevented from being changed or distorted.

Further, the auxiliary support is preferably a polymer film having a glass transition temperature of about 20° C. to 80° C., and more preferably about 30° C. to 60° C. When the glass transition temperature of the auxiliary support is within the above range, there is an advantage in that the polymer film can have suitable flowability during stretching, and thus can sufficiently function as a support, and does not interfere with stretching of the polyvinyl alcohol-based film, thus increasing the efficiency of stretching.

Further, after the auxiliary support is wet-stretched in the machine direction (MD) as described below, it preferably a shrinkage rate of 3.0% or less, and more preferably 1.0% or less. When the shrinkage rate of the auxiliary support is within the above range, damage such as distortion, breakage or end rolling can be prevented from occurring after stretching of the polyvinyl alcohol-based film and the auxiliary support, because the shrinkage rate of the polyvinyl alcohol-based film is generally about 1.0%.

Herein, the shrinkage rate of the auxiliary support can be determined by fixing the auxiliary support film to a stretching machine, stretching the fixed film 6 times, measuring the length of the stretched film, measuring the length of the shrunk film at 10 minutes after removal of the tension of the stretching machine, and calculating the difference in the film length between stretching and shrinking.

Meanwhile, the auxiliary support may be formed on any one or both of the upper surface and lower surface of both ends in the transverse direction (TD) of the unstretched polyvinyl alcohol-based film.

Generally, as the unstretched polyvinyl alcohol-based film become thinner, it is more susceptible to water, and is also easily affected by atmospheric water. Particularly, the end or side of the film, into which water can penetrate in three directions, is more quickly swollen by water. Due to this swelling, the stiffness of the film is reduced and the volume is increased, and thus the film becomes very soft. In this state, if tension is applied in the machine direction (MD), the film will be rolled, and folded during passage through nip rolls. However, as described below, when the auxiliary support is provided on both ends in the transverse direction (TD) perpendicular to the machine direction (MD) of the unstretched polyvinyl alcohol-based film, it can compensate for the thickness of the unstretched polyvinyl alcohol-based film while reducing the swelling rate, and thus can reduce the rolling phenomenon during the stretching of the unstretched polyvinyl alcohol-based film in the machine direction (MD).

Herein, the unstretched polyvinyl alcohol-based film and the auxiliary support polymer film may be attached to each other by a weak attraction or a water-based adhesive, but are preferably attached by an adhesive in terms of ensuring adhesion therebetween and process stability.

Specifically, the step of forming the auxiliary support preferably comprises a step of attaching the polymer film to both ends in a direction perpendicular to the stretching direction of the unstretched polyvinyl alcohol-based film by an adhesive, followed by drying.

In an embodiment, an adhesive layer may first be formed on both ends in the transverse direction (TD) of the unstretched polyvinyl alcohol-based film. Herein, the adhesive layer has a thickness of about 70-100 nm, and is preferably formed of a water-based adhesive having a viscosity of 4-50 cP. For example, the adhesive layer may be formed of an aqueous adhesive including at least one selected from the group consisting of polyvinyl alcohol-based resin, an acrylic resin, and vinyl acetate-based resin. In addition, the adhesive layer may be formed of a water-based adhesive having a degree of polymerization of 500-1800 and a solid content of 2-10 wt %.

More specifically, in terms of adhesive strength and the like, polyvinyl alcohol-based adhesives are preferably used, and among them, a modified polyvinyl alcohol-based adhesive containing an acetoacetyl group or the like is particularly preferably used. Specific examples of polyvinyl alcohol-based adhesive that may be used in the present invention include, but are not limited to, Gohsefiner Z-100, Z-200, Z-200H, Z-210, Z-220 and Z-320 (Nippon Synthetic Chemical Industry Co., Ltd.).

Next, the polymer film is attached to the adhesive layer formed of the adhesive, and attachment of the polymer film to the adhesive layer may be performed according to any method known in the art.

Meanwhile, the method of the present invention may further comprise a drying step, after the step of attaching the polymer film to the polyvinyl alcohol-based film by the adhesive. The drying step is preferably performed in an oven at a relatively low temperature of 40° C. to 50° C. for 1 minute or more. If the drying temperature is higher than the upper limit of the above range, the evaporation of water from the polyvinyl alcohol-based film will increase, and thus the film surface will be wrinkled and the stretching property of the film will decrease.

Meanwhile, the auxiliary support may also be formed by folding both ends of the unstretched polyvinyl alcohol-based film, and attaching the folded portions to the film by an adhesive, followed by drying, in place of attaching a separate polymer film to the unstretched polyvinyl alcohol-based film. If the auxiliary support is formed in this manner, it will be formed of the same material as that of the unstretched polyvinyl alcohol-based film, and thus the auxiliary support and the unstretched polyvinyl alcohol-based film will have the same component, and stretching behaviors similar between the two will occur.

Herein, the adhesive, the attachment method and the drying method are as described above, and thus the detailed description thereof is omitted.

In the present invention, the configuration having the auxiliary support formed on both ends in the transverse direction (TD) of the unstretched polyvinyl alcohol-based film is not specifically limited. As can be seen in FIGS. 1 and 2, when the stretching direction of the film in the present invention is referred to as the machine direction (MD), the auxiliary support is formed on both ends in the transverse direction (TD) perpendicular to the stretching direction. Specifically, the auxiliary support formed on both ends in the transverse direction (TD) preferably has a uniform width, and extends in the same direction as the machine direction (MD) of the polyvinyl alcohol-based film so as to have the same length as that of the polyvinyl alcohol-based film. Herein, the length and width of the unstretched polyvinyl alcohol-based film are referred to as $V_0$ and $W_0$, respectively, and the length and width of the auxiliary support are referred to as V and W, respectively.

Herein, the ratio of the width of the auxiliary support to the width of the unstretched polyvinyl alcohol-based film, that is, $W/W_0$, is preferably about 0.06-0.25, and more preferably about 0.08-0.20. If the $W/W_0$ value is less than 0.06, the auxiliary support will not perform its function, and thus end folding and breakage will occur, and if it more than 0.25, the auxiliary support will interfere with the widthwise shrinkage of the unstretched polyvinyl alcohol-based film during stretching, and thus sufficient optical properties cannot be obtained.

Further, the length of the auxiliary support is preferably the same as that of the polyvinyl alcohol-based film.

Meanwhile, after the auxiliary support was formed on both ends in the transverse direction (TD) of the unstretched polyvinyl alcohol-based film, the polyvinyl alcohol-based film is wet-stretched in the machine direction (MD) in such the thickness thereof is 10 μm or less, thereby manufacturing a thin polarizer.

Herein, the stretching direction is the machine direction (MD) of the film, and the auxiliary support is formed on both ends in the transverse direction (TD) of the film. In addition, the stretching is performed by a wet-stretching method.

The wet-stretching step is performed mainly by a tenter stretching method or an inter-roll stretching method, and may be performed together with at least one step of a step of dyeing the polyvinyl alcohol-based film with iodine and/or a dichroic dye, and a step of crosslinking the dyed iodine and/or dichroic dye to the polyvinyl alcohol-based film.

More specifically, the method for manufacturing the thin polarizer according to the present invention comprises a swelling step, a dyeing step, a crosslinking step, a stretching step, a washing step and a drying step, like a conventional method for manufacturing a polarizer. Hereinafter, the method of manufacturing of the thin polarizer by wet stretching according to the present invention will be described, but is not limited thereto.

Among the above-described steps, the steps other than the drying step are each performed in a state in which the unstretched polyvinyl alcohol-based film is immersed in a constant-temperature bath filled with at least one solution selected from among various solutions.

In addition, the order and repeat number of the steps are not specifically limited. The steps may be performed simultaneously or sequentially, and one or more of the steps may also be omitted. For example, the stretching step may be performed before or after the dyeing step, and may be performed simultaneously with the swelling step or the dyeing step.

The swelling step is performed before dyeing of the unstretched polyvinyl alcohol-based film. In the swelling step, the unstretched polyvinyl alcohol-based film is immersed in a swelling bath filled with an aqueous solution for swelling to remove impurities such as dust or an anti-blocking agent from the surface of the polyvinyl alcohol-based film and to swell the polyvinyl alcohol-based film so as to thereby increase the efficiency of stretching and prevent non-uniform dyeing, thereby improving the physical properties of the polarizer.

As the aqueous solution for swelling, water (pure water or deionized water) may be used alone. When the aqueous solution for swelling contains a small amount of glycerin or potassium iodide, it can also improve the processability of the polymer film in addition to swelling the polymer film. Preferably, the content of glycerin is 5 wt % or less, and the content of potassium iodide is 10 wt % or less, based on 100 wt % of the aqueous solution for swelling.

The temperature of the swelling bath is preferably 20° C. to 45° C., and more preferably 25° C. to 40° C.

The time during which the swelling step is performed (the time of immersion of the swelling bath) is preferably 180 seconds or less, and more preferably 90 seconds or less. When the immersion time is shorter than the lower limit of the above range, saturation by excessive swelling of the polyvinyl alcohol-based film can be prevented, and thus breakage of the polyvinyl alcohol-based film due to softening can be prevented, the film can be uniformly adsorbed with iodine in the dyeing step, and therefore a degree of polarization can be improved.

The swelling step may be omitted, and may also be performed simultaneously with the dyeing step as follows.

The dyeing step is a step of immersing the polyvinyl alcohol-based film in a dyeing bath filled with an aqueous solution for dyeing containing a dichroic substance, for example, iodine, to adsorb iodine onto the polyvinyl alcohol-based film.

The aqueous solution for dyeing may contain water, a water-soluble organic solvent, a mixed solvent thereof, and iodine. To further increase the dyeing efficiency, the aqueous solution for dyeing may further contain iodide as a dissolution aid. As the iodide, potassium iodide, lithium iodide, sodium iodide, zinc iodide, aluminum iodide, lead iodide, copper iodide, barium iodide, calcium iodide, tin iodide, titanium iodide and the like may be used alone or in combination. Among them, potassium iodide is preferably used because it has high solubility in water.

The temperature of the dyeing bath is preferably 5° C. to 42° C., and more preferably 10° C. to 35° C. Also, the time of immersion of the polyvinyl alcohol-based film in the dyeing bath is not specifically limited, but is preferably 1-20 minutes, and more preferably 2-10 minutes.

The crosslinking step is a step of immersing the dyed polyvinyl alcohol-based film in an aqueous solution for crosslinking to fix the iodine molecule physically adsorbed onto the film, so that dyeing with the iodine molecule is not reduced by an external environment. Although the dichroic dye is not frequently exposed to a damp environment, the iodine molecules are frequently dissolved or sublimed in some environments if the crosslinking thereof is unstable. For this reason, sufficient crosslinking of the iodine molecules is required. In addition, the crosslinking step is critical to the present invention, because the polyvinyl alcohol-based film should generally be stretched at the highest possible ratio to orient the iodine molecules between all the polyvinyl alcohol molecules to thereby improve the optical properties of the film.

The stretching step may be performed simultaneously with the crosslinking step, and in this case, the unstretched polyvinyl alcohol-based film is stretched in the machine direction (MD). Meanwhile, the stretching step is performed in such that the thickness of the polyvinyl alcohol-based film is preferably 10 µm or less, and more preferably 8 µm or less. For example, the polyvinyl alcohol-based film may be stretched about 4-9 times, and preferably about 5-7 times, at a temperature of about 20° C. to 85° C., and preferably about 40° C. to 65° C.

If the stretching is performed at a temperature lower than 20° C., the mobility of molecular chains in the polyvinyl alcohol-based film can be reduced to reduce the stretching efficiency, and if the stretching is performed at a temperature higher than 85° C., the polyvinyl alcohol-based film can be softened, and thus the strength thereof can be reduced. If the stretching ratio is less 4 times, the alignment of the chains cannot sufficiently occur, and if the stretching ratio is more than 9 times, molecular chains in the polyvinyl alcohol-based film can be cleaved.

As described above, the stretching step may be performed together with the swelling step, the dyeing step and the crosslinking step, and may also be performed independently using a separate stretching bath filled with an aqueous solution for stretching, after the crosslinking step.

Meanwhile, the washing step is a step of immersing the crosslinked and stretched polyvinyl alcohol-based film in a washing bath filled with an aqueous solution for washing to remove unnecessary residue, such as a crosslinking agent attached to the polyvinyl alcohol-based film in the previous steps. The washing step may be omitted, and may also be performed after completion of each of the previous steps, such as the dyeing step, the crosslinking step or the stretching step. In addition, it may be repeated one or more times, and the number of repeats thereof is not specifically limited.

The aqueous solution for washing may be water, which may further contain iodide. The temperature of the washing bath is preferably 10° C. to 60° C., and more preferably 15° C. to 40° C.

The drying step is a step of drying the washed polyvinyl alcohol-based film and further improving the orientation of the dyed iodine molecules to obtain a polarizer having excellent optical properties. Drying methods that may be used in the present invention include natural drying, air drying, heat drying, far infrared ray drying, microwave drying, and hot-air drying. In recent years, microwave drying that dries films by activation of only water has been newly used. Generally, hot-air drying is mainly used. For example, the film may be dried with hot air at a temperature of 20° C. to 90° C. for 1-10 minutes. In addition, the drying temperature is preferably as low as possible in order to prevent the deterioration of the polarizer. The drying temperature is more preferably 80° C. or lower, and most preferably 60° C. or lower.

Meanwhile, the method may further comprise, after the step of wet-stretching the polyvinyl alcohol-based film, which has the auxiliary support formed thereon, in the machine direction (MD), a step of separating the auxiliary support from the polyvinyl alcohol-based film. Herein, the step of separating the auxiliary support may be performed by applying a peel force to the polyvinyl alcohol-based film or the auxiliary support to separate them from each other. Alternatively, it may also be performed by cutting both ends of the polyvinyl alcohol-based film having the auxiliary support formed thereon.

Meanwhile, the method for manufacturing the polarizer according to the present invention is characterized in that even a single film can be wet-stretched at a high ratio without end rolling and breakage of the film. Specifically, in the method for manufacturing the polarizer according to the present invention, the highest possible stretching ratio is at least 7.3, which is higher than the highest possible stretching ratio of a single film in the prior art.

Generally, thin polarizers very rapidly absorb and discharge water (if the film thickness is reduced to half, the water absorption rate of the film is increased by four times). In other words, the film is rapidly swollen in the swelling bath, and when it is discharged from the swelling bath and exposed to air, it is immediately dried. For this reason, water in both ends of the film, which relatively easily absorb and release water, rapidly evaporates, and thus drying and rolling at both ends irregularly occur, resulting in a decrease in the stretchability of the film. Thus, when the auxiliary support is provided on both ends of the film, rapid evaporation of water from both ends can be prevented to prevent the rolling of the film, and the tensile strength of both ends, to which a relatively great force is applied, can be increased, thereby increasing the stretchability of the film.

Meanwhile, the present invention provides a polarizer manufactured by the above-described method.

The thickness of the polarizer of the present invention, manufactured by the above-described method, is as extremely thin as 10 μm or less, preferably about 1-10 μm, and more preferably 3-10 μm. Even at this thin thickness, the polarizer shows a single transmittance of about 40-43% and a degree of polarization of about 99% or higher, indicating that it has very excellent optical properties.

The present invention also provides a polarizing plate comprising a protective film deposited on at least one surface of the polarizer.

Specifically, a polarizing plate can be formed by depositing a transparent film on one or both surfaces of the polarizer of the present invention. As the transparent film, any film that is used as a polarizer protective film or a retardation film in the art may be used without limitation. For example, the transparent film may be a film comprising one or more selected from the group consisting of a polyester-based polymer, a styrene-based polymer, a cellulose-based polymer, a polyethersulfone-based polymer, a polycarbonate-based polymer, an acrylic polymer, a polyolefinic polymer, a polyamide-based polymer, a polyimide-based polymer, a sulfone-based polymer, a polyethersulfone-based polymer, a polyether ether kotone-based polymer, a polyphenylene sulfide-based polymer, a vinyl alcohol-based polymer, a vinylidene chloride-based polymer, a vinyl butyral-based polymer, an acrylate-based polymer, a polyoxymethylene-based polymer, an epoxy-based polymer, and mixtures of these polymers.

A method for depositing the transparent film on the polarizer is not specifically limited, and may be performed using an adhesive or glue well known in the art. Herein, the adhesive or glue may be suitably selected by taking into consideration the material of transparent film used, etc. For example, when the transparent film is made of TAC, a water-based adhesive such as a polyvinyl alcohol-based adhesive may be used, and when the transparent film is made of an acrylic film or a COP film, a photocurable or thermosetting adhesive such as an acrylic-based adhesive or an epoxy-based adhesive may be used.

In addition, the polarizing plate of the present invention preferably further has an adhesive layer that facilitates deposition of the polarizing plate onto liquid crystal cells or the like, and the adhesive layer may be disposed on one or both surfaces of the polarizing plate. The adhesive is preferably sufficiently cured by heat or UV light after adhesion so that the mechanical strength thereof is increased. In addition, it preferably shows high adhesion between two films such that the two films are not separated from each other unless any one of the two films is broken.

An adhesive that may be used for the above adhesive layer preferably has high optical transparency and shows suitable wetting, cohesive or adhesive properties. Specific examples of the adhesive include adhesives prepared using an acrylic polymer, a silicone-based polymer, polyester, polyurethane, polyether, synthetic rubber or the like as a base polymer.

If necessary, a primer layer or adhesive layer for increasing adhesion may further be provided between the adhesive layer and the polyvinyl alcohol-based polarizer and/or between the adhesive layer and the transparent film.

MODE FOR INVENTION

Hereinafter, the present invention will be described in further detail with reference to examples. However, these examples are provided for a better understanding of the present invention and are not intended to limit the scope of the present invention.

Examples 1 to 3

(1) Manufacture of Polarizing Film (Polarizer)

To both ends of a polyvinyl alcohol film (Nippon Chemical Industry Co., Ltd.; M2005 grade; 20 μm), an auxiliary support (made of the same material as that of the polyvinyl alcohol film) was attached using a PVA-based water-soluble adhesive (Z-200, Nippon Chemical Industry Co., Ltd.), and then dried in an oven at 40° C. for 1 minute, thereby preparing a film for stretching. Herein, the width (Wo) of the polyvinyl alcohol film and the width (W) of the auxiliary support are as described in Table 1 below. The film was dyed in a dye solution containing 0.15 wt % of iodine for 20 seconds, and then stretched about 2 times in an aqueous solution of 1 wt % boric acid. Next, the film was finally stretched 6 times in an aqueous solution of 2 wt % boric acid, and then immersed in an aqueous solution of 5 wt % potassium iodide (KI) for 15 seconds, after which it was dried in an oven at 50° C. for 3 minutes, thereby manufacturing a polarizer.

Comparative Example 1

A polyvinyl alcohol film (Nippon Chemical Industry Co., Ltd.; M2005 grade; 20 μm) was dyed in a dye solution containing 0.15 wt % of iodine for 20 seconds, and then stretched about 2 times in an aqueous solution of 1 wt % boric acid. Next, the film was stretched 6 times in an aqueous solution of 2 wt % boric acid, and then immersed in an aqueous solution of 5 wt % potassium iodide (KI) for 15 seconds, after which it was dried in an oven at 50° C. for 3 minutes, thereby manufacturing a polarizer.

Test Example 1

In the stretching step of each of Examples 1 to 3 and Comparative Example 1, the polyvinyl alcohol-based film was stretched until it was broken. The stretching ratio when the film was broken was defined as the maximum stretching ratio. The results are shown in Table 1 below.

Test Example 2

The optical properties of the polarizers manufactured by stretching the polyvinyl alcohol-based film 6 times in the stretching step of Examples 1 to 3 and Comparative Example 1 were measured using JASCO V-7100 Spectrophotometer, and the results of the measurement are shown in Table 1 below. Meanwhile, the single transmittance in Table 1 means the transmittance of a single polarizer, and the degree of polarization is defined as the following equation 1 by the parallel transmittance (Tp) obtained for two polarizing plates, arranged such that their absorption axes are parallel with each other, and the cross transmittance (Tc) obtained for two polarizing plates arranged such that their absorption axes cross each other at an angle of 90°.

Degree of polarization=$[(Tp-Tc)/(Tp+Tc)]^{1/2}$     Equation 1

TABLE 1

| Category | PVA film and support | | | Physical properties of polarizer (stretched 6 times) | | | |
|---|---|---|---|---|---|---|---|
| | PVA width (mm) | Auxiliary support width (mm) | Maximum stretch ratio | Width (μm) | Thickness (μm) | Single transmittance (%) | Degree of polarization (%) |
| Example 1 | 80 | 5 | 7.3 | 42 | 4.5 | 41.72 | 99.9861 |
| Example 2 | 80 | 10 | 7.7 | 43 | 4.2 | 41.50 | 99.9834 |
| Example 3 | 80 | 20 | 8.3 | 47 | 3.5 | 41.48 | 99.9684 |
| Comparative Example 1 | 80 | — | 7.2 | 42 | 4.5 | 41.64 | 99.9870 |

As can be seen in Table 1 above, the maximum stretch ratio of the film having the auxiliary support formed thereon significantly increased compared to that of the film having no auxiliary support formed thereon. In addition, the film having the auxiliary support formed thereon became thinner, and the breakage thereof during stretching was reduced.

In addition, as can be seen in Table 1 above, the application of the manufacturing method according to the present invention still showed high single transmittance and a high degree of polarization (99.9% or higher).

Although the preferred embodiments of the present invention have been described for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS USED IN THE DRAWINGS

1: polyvinyl alcohol-based film having an auxiliary support formed thereon before stretching;
11: polyvinyl alcohol-based film;
12: auxiliary support;
Vo: length of polyvinyl alcohol-based film;
Wo: width of polyvinyl alcohol-based film;
W: width of auxiliary support.

The invention claimed is:

1. A method for manufacturing a thin polarizer, comprising the steps of:
    forming an auxiliary support on both ends in transverse direction (TD) of an unstretched polyvinyl alcohol-based film; and
    wet-stretching the polyvinyl alcohol-based film, which has the auxiliary support formed thereon, in a machine direction (MD) of the film in such that a thickness of the polyvinyl alcohol-based film is 10 μm or less,
    wherein a ratio of a width of the auxiliary support to a width of the unstretched polyvinyl alcohol-based film is 0.06-0.25.

2. The method of claim 1, wherein the auxiliary support is a polymer film comprising at least one selected from the group consisting of polyvinyl alcohol-based resin, low-density polyethylene resin, high-density polyethylene resin, high-density polyethylene/ethylene vinyl acetate copolymer resin, polypropylene resin, isophthalic acid-containing polyethylene terephthalate resin, water-soluble cellulose resin, and acrylic resin.

3. The method of claim 1, wherein the auxiliary support is a polymer film having a glass transition temperature of 20° C. to 80° C.

4. The method of claim 1, wherein the auxiliary support has a shrinkage rate of 3.0% or less after wet-stretching.

5. The method of claim 1, wherein the auxiliary support is formed on at least one surface of upper and lower surfaces of both ends in the transverse direction (TD) of the unstretched polyvinyl alcohol-based film.

6. The method of claim 1, wherein the step of forming the auxiliary support comprises a step of attaching a polymer film to both ends in the transverse direction (TD) of the unstretched polyvinyl alcohol-based film by an adhesive, followed by drying.

7. The method of claim 6, wherein the adhesive is a water-based adhesive having a viscosity of 4 cP-50 cP.

8. The method of claim 1, wherein the auxiliary support is formed by folding both ends in the transverse direction (TD) of the unstretched polyvinyl alcohol-based film, attaching the folded ends to the film by an adhesive, followed by drying.

9. The method of claim 1, wherein the step of wet-stretching the polyvinyl alcohol-based film, which has the auxiliary support formed thereon, in a machine direction (MD) of the film, is performed by stretching the polyvinyl alcohol-based film 4-9 times at a temperature of 20° C. to 85° C.

10. The method of claim 1, further comprising, after the step of wet-stretching the polyvinyl alcohol-based film, which has the auxiliary support formed thereon, in the machine direction (MD) of the film, a step of separating the auxiliary support from the polyvinyl alcohol-based film.

\* \* \* \* \*